Aug. 12, 1969  P. A. J. LOSSERAND  3,460,203
INJECTOR PRESS FOR OBTAINING MULTICOLOURED
PIECES IN PLASTIC MATERIAL
Filed Dec. 2, 1966
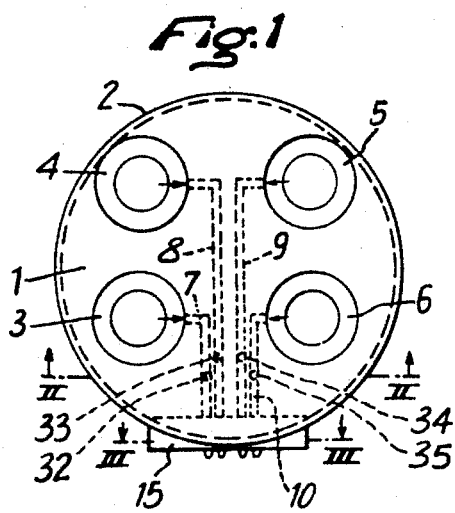
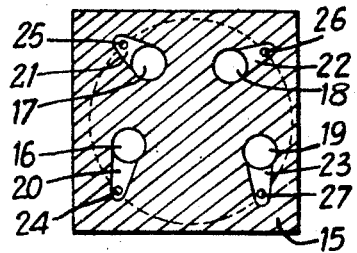
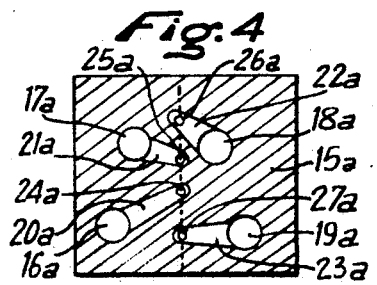
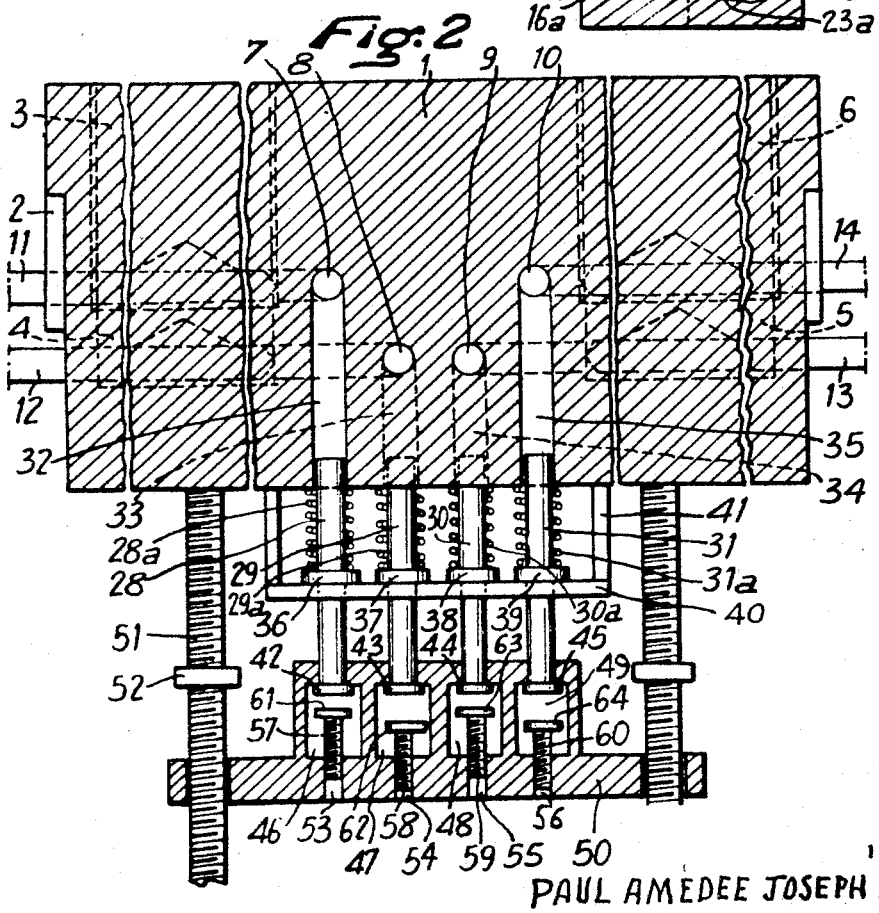
INVENTOR
PAUL AMEDEE JOSEPH LOSSERAND
By Linton and Linton
ATTORNEYS United States Patent Office 3,460,203
Patented Aug. 12, 1969

3,460,203
INJECTOR PRESS FOR OBTAINING MULTICOLOURED PIECES IN PLASTIC MATERIAL
Paul Amedee Joseph Losserand, Route de Tamie-La Curiale 74, Faverges, Haute-Savoie, France
Filed Dec. 2, 1966, Ser. No. 598,750
Claims priority, application France, Dec. 11, 1965, 41,895
Int. Cl. B29f 1/12; B29c 3/04, 9/50
U.S. Cl. 18—30      4 Claims

ABSTRACT OF THE DISCLOSURE

An injection press for obtaining multicolored pieces of plastic material, comprising a plurality of melting pots adapted to receive and melt colored materials, a nozzled plate connected to the melting pots through supply conduits and injection means adapted to inject melted materials into a mold. Said nozzled plate presents outlets disposed according to a line or to a circle, while the injection means is constituted by pistons having regulable strokes and which slide into cylinders for driving back through the nozzles regulable doses of colored materials.

---

Devices are already known for furnishing two-coloured pieces in plastic material.

The present invention has for its object to provide an injector press for obtaining multicoloured pieces in plastic material, characterised by this that the pieces obtained can be coloured linearly or by circular sectors, and that the different coloured parts can be of the same size or of different sizes.

According to the present invention the injection press comprises a plurality of melting pots, each pot being adapted to receive and to melt plastic material of a particular colour, a nozzled plate having a plurality of nozzles, each nozzle having an inlet connected to a corresponding melting pot by means of a supply conduit, and an outlet, the outlets being disposed in a predetermined pattern, injection pistons adapted to slide in corresponding cylinders, each cylinder communicating with a particular supply conduit, the injection pistons being adapted to inject regulable doses of melted material through the nozzles into a mould.

Preferably the injector press is constituted by some melting pots situated at different levels and equipped with a heating device, at the interior of which are pressed the different coloured materials by means of weights, the bases of these pots communicating, by the intermediary of flow canals equipped with an injection device, with exit orifices of said flow canals on which come to adapt themselves at will different nozzled plates. These nozzled plates are such that one of their faces comprises some openings of the same disposition as the exits of said flow canals and that their other face comprises orifices disposed according to a circle or according to a line, the said openings and the said orifices being in communication at the interior of said nozzled plates, in such a way to permit the circular or linear disposition of different coloured materials, during their ejection, into a mould situated facing the said nozzled plates and of which the displacement is obtained by means of a manoeuvering jack.

In one embodiment of the invention, the injection device for coloured materials is constituted by injection pistons of which the upper parts are displaced at the interior of the injection cylinders situated in planes perpendicular to the planes of said flow canals and which open into the lower part of these canals. The down stroke of the injection pistons under the effect of an appropriate elastic return device, which is synchronised with the opening of gates linking the melting pots and the flow canals, causes the suction of the coloured material into the injection cylinders, while the material already injected by the injection nozzles is re-cooled and the mould moves back; during the upstroke of the injection pistons under the pressure of the contact heads being displaced in a rigid way under the action of a jack, which is synchronised with the closing of said gates, produces the expulsion of the coloured material out of the injection cylinders, into the mould by the intermediary of the nozzled plate. The volume of coloured material ejected by each cylinder can be regulated at will, the volume being proportional to the length of the upstroke of each injection piston, by regulating the relative clearance between the lower end of each injection piston and the said corresponding contact head, which permits the size of each coloured segment of the piece obtained to be regulated.

The upstroke of the injection pistons is due to a jack of very small power, which permits injection under small pressure and avoids any positive locking of the mould which is then maintained in the injection position only by its manoeuvering jack.

In the case of the manufacture of pieces relatively heavy, the press according to the invention can be equipped with a screw type plastification unit whose operating frequency can be determined by means of cyclic feed regulators.

A preferred embodiment of the device according to the invention will be described hereafter with reference to the annexed drawings in which:

FIGURE 1 is a plan view of the device according to the invention;

FIGURE 2 is a vertical section taken along the line II—II of FIGURE 1;

FIGURE 3 is a vertical section taken along the line III—III of FIGURE 1 and showing a nozzled plate permitting a circular injction; and FIGURE 4 shows another nozzled plate permitting a linear injection.

Referring to FIGURES 1 and 2, a body 1 is shown in cylindrical shape surrounded by a zone heater 2 having automatic regulation, this zone heater being able to be constituted for example by means of electric resistances. Four melting pots 3, 4, 5 and 6, also of cylindrical shape, are hollowed vertically in the body 1, at different levels, in the drawing the pots 3, 6 being at the same level, higher than that of the pots 4, 5. The plastic materials introduced into the melting pots 3, 4, 5, 6 are of different colours, and they are pressed at the interior of each melting pot by some weights (not shown in the drawing) which are established in a manner to give a determined force to the flow of the melted material which is effected by some cards 7, 8, 9, 10 after passing through gates, respectively 11, 12, 13, 14, when these are open.

The canals 7, 8, 9, 10 originate at the base of the melting pots respectively 3, 4, 5, 6 and are hollowed at the interior of the body 1 according to horizontal planes, so that the canals 7, 10 are in the same horizontal plane situated at a level higher than that of the horizontal plane in which are situated the canals 8, 9.

The canals 7, 8, 9, 10 open laterally out of the body 1 according to circular openings whose reciprocal disposition is determined by that of the said canals. In the figure a plate 15 is shown of which one face is pierced by openings 16, 17, 18, 19 disposed in a manner to be able to adapt themselves exactly on the terminal parts of canals 7, 8, 9, 10, these openings 16, 17, 18, 19 are continued on the other face of the plate 15 by some conduits, respectively 20, 21, 22, 23, which can be for example millings directed in a plane perpendicular to the axes of piercing of the openings 16, 17, 18, 19, the said millings 20, 21, 22, 23 being covered with a plate rigid with the plate 15 and pierced with orifices 24, 25, 26, 27 disposed according to a circle and opening into the millings 20, 21, 22, 23.

Thus the plastic materials of different colours coming out of the canals 7, 8, 9, 10 will flow through the orifices 24, 25, 26, 27 into a mould of appropriate shape (not shown in the drawings) to form the pieces of which the different colours will be distributed according to circular sectors.

In FIGURE 4 another nozzled plate 15a is shown of which one face is pierced with openings 16a, 17a, 18a, 19a, disposed in a manner to be able to adapt themselves exactly on the terminal parts of canals 7, 8, 9, 10, these openings being continued by some millings 20a, 21a, 22a, 23a, which open out into the other face of the plate 15a by orifices 24a, 25a, 26a, 27a, disposed according to a line. Thus the plastic materials flow through the orifices 24a, 25a, 26a, 27a into an appropriate mould to form the pieces of which the different colours are distributed linearly.

The flow of coloured materials out of canals 7, 8, 9, 10 is controlled by the movement of injection pistons 28, 29 30, 31 which are displaced in the interior of injection cylinders, respectively 32, 33, 34, 35 which open into the interior of canals 7, 8, 9, 10 and are disposed so as to be perpendicular to the lower face of the said canals. The bodies of the injection pistons 28, 29 30, 31 are rigid with stops 36, 37, 38, 39 which under the action of springs 28a, 29a, 30a, 31a, bear against a plate 40 rigid with the body 1 by the uprights 41, the plate 40 being pierced with holes 42, 43, 44, 45 in which slide the bodies of the pistons 28, 29, 30, 31. The lower ends 42, 43, 44, 45 of pistons 28, 29, 30, 31 are engaged in a manner to be able to be displaced at the interior of chambers 46, 47, 48, 49 rigid with a cross-bar 50 which slides on two parallel threaded rods 51 rigid with the body 1. Some stroke-limiting nuts 52 disposed on the rods 51 limit the upward movement of the cross-bar 50 under the action of a hydraulic or pneumatic jack (not shown in the drawing). In tappings 53, 54, 55, 56 in the cross-bar 50, situated in the prolongation of the chambers respectively 46, 47, 48, 49, are introduced the threaded bodies of screws 57, 58, 59, 60 whose heads 61, 62, 63, 64 are situated at the interior of chambers 46, 47, 48, 49, facing the ends 42, 43, 44, 45 of the injection pistons 28, 29, 30, 31. The clearance between the heads 61, 62, 63, 64 and the ends 42, 43, 44, 45 can be regulated by screwing or unscrewing the screws 57, 58, 59, 60 in the corresponding tappings of the cross-bar 50, which permits thus the upstroke of the injection pistons to be regulated at will during the upward movement of the cross-bar 15, and thus of the screws 57, 58, 59, 60, under the effect of the jack.

The gates 11, 12, 13, 14 which govern the opening and the closing of the communication between the melting pots 3, 4, 5, 6 and the canals 7, 8, 9, 10 are controlled for example by jacks (not shown in the drawing), so that the said gates be open during the downstroke of the injection pistons, and that the said gates be closed during the upstroke of the said pistons.

The operations of the device is then the following. At first, the jack actuating the cross-bar 50 is not supplied and under the action of springs 28a, 29a, 30a, 31a, the cross-bar 50 and the injection pistons 28, 29, 30, 31, come into the bottom position (the position shown in FIGURE 2), this downstroke being limited by stops 36, 37, 38, 39 abutting on the plate 40. During this downward movement of said pistons the gates 11, 12, 13, 14 are open and the coloured materials flow through the canals 7, 8, 9, 10 into the entrance of the injection cylinders 32, 33, 34, 35 in which these materials are sucked by the movement of the pressure created by the descent of the injection pistons. When the injection pistons are in the bottom position, the gates 11, 12, 13, 14 are then closed, and the jack actuating the cross-bar 50 is supplied, which pushes the said cross-bar according to an upward movement, until it abuts on the nuts 52. The screws 57, 58, 59, 60 follow the upward movement of the cross-bar 50 and their heads 61, 62, 63, 64 come into contact respectively with the ends 42, 43, 44, 45 of the injection pistons, and push the said pistons with an upward movement in the interior of the injection cylinders 32, 33, 34, 35 which compresses the springs 28a, 29a, 30a, 31a, and which makes the coloured materials engaged in the said cylinders flow back again which, not being able to return to the interior of the melting pots because of the closing of the gates 11, 12, 13, 14, are evacuated by the terminal orifices 7a, 8a, 9a, 10a, of the flow canals 7, 8, 9, 10, by the intermediary of an appropriate nozzled plate (as described above) to obtain a circular or linear coloration. Then the supply of the jack actuating the cross-bar 50 is cut, this latter coming back then into the bottom position under the action of the springs, while the gates 11, 12, 13, 14 open, and the operational cycle begins again.

According as it is desired to obtain pieces of which the coloured parts are of the same size or of different sizes, the clearance between the screw heads 61, 62, 63, 64, and the injection piston ends 42, 43, 44, 45 can be set equal or different. In effect, the stroke of the injection piston, which corresponds to the volume of coloured material evacuated and thus to the size of the coloured part of the piece is proportional to this said clearance. Thus in the case of FIGURE 2, the clearance of the screw heads 61, 63 with the ends respectively 42, 44 of the injection pistons is the same, and is less than that clearance of the screw heads 62, 64 with the ends 43, 45 of the injection pistons, which can correspond, in the case in which the nozzled plate of FIGURE 3 is used, for a circular piece of which the coloured parts correspond to the melting pots 3 and 5 represent each ⅓ of the length of the piece, while the coloured parts corresponding to the melting pots 4 and 6 represent each ⅙ of the length of the piece.

It will be understood that the present description is not of a limiting character, and that various additions or modifications can be foreseen without departing from the scope of the invention. In particular, a press according to the invention can be conceived which comprises more than four melting pots and which permits then to inject simultaneously more than four materials of different colours.

What I claim is:

1. An injection press for obtaining multicoloured pieces of plastic material, comprising a body, a plurality of melting pots carried by said body and adapted to receive and to melt coloured materials, distribution means of coloured materials with a passage corresponding to each of said melting pots, supply conduits connecting each of said melting pots to said corresponding passage, injection pistons sliding in said supply conduits, a pair of parallel spaced rods solid with the press body and directed according to the axis of the melting pots, a sliding member moving along said rods, and screws engaged in said sliding member the heads of which are disposed facing the lower ends of said injection pistons, the space between each screw head and the lower end of the corresponding injection piston being adjustable by varying the engagement degree of the screw in the sliding member to regulate each injection piston stroke at the time of the sliding member movement.

2. An injection press as claimed in 1, in which said distribution means of coloured materials are constituted by a nozzled plate having outlets disposed according to a line, interior canals in the nozzled plate connecting said supply conduits to said outlets and being directed perpendicularly with respect to the axes of said supply conduits and said outlets.

3. An injection press as claimed in 1, in which said distribution means of coloured materials are constituted by a nozzled plate having outlets disposed according to a circle, interior canals in the nozzled plate connecting said supply conduits to said outlets and being directed perpendicularly with respect to the axes of said supply conduits and said outlets.

4. An injection press for obtaining multicoloured pieces of plastic material, comprising a body, a plurality of melting pots carried by said body and adapted to receive and to melt coloured materials, distribution means of coloured materials with a passage corresponding to each of said melting pots, supply conduits connecting each of said melting pots to said corresponding passage, injection pistons sliding in said supply conduits, a pair of parallel spaced rods solid with the press body and directed according to the axis of the melting pots, a sliding member moving along said rods, and screws engaged in said sliding member the heads of which are disposed facing the lower ends of said injection pistons, the space between each screw head and the lower end of the corresponding injection piston being adjustable by varying the engagement degree of the screw in the sliding member to regulate each injection piston stroke at the time of the sliding member movement, and a gate device acting on said supply conduits to selectively stop the flow of coloured materials out of the melting pots during the forcing of the materials into a mould under the action of the injection pistons and to re-establish the said flow during the inverse movement of said pistons.

References Cited

UNITED STATES PATENTS

| | | |
|---|---|---|
| 2,672,650 | 3/1954 | Westerberg. |
| 2,953,815 | 9/1960 | Mainardi. |
| 3,239,881 | 3/1966 | Larson. |

FOREIGN PATENTS

| | | |
|---|---|---|
| 1,072,799 | 1/1960 | Germany. |
| 1,225,322 | 2/1960 | France. |

WILBUR L. McBAY, Primary Examiner

U.S. Cl. X.R.

18—12